Aug. 2, 1927.  A. NOSAN  1,637,872
STEERING MECHANISM FOR AEROPLANES
Filed July 26, 1926   2 Sheets-Sheet 2
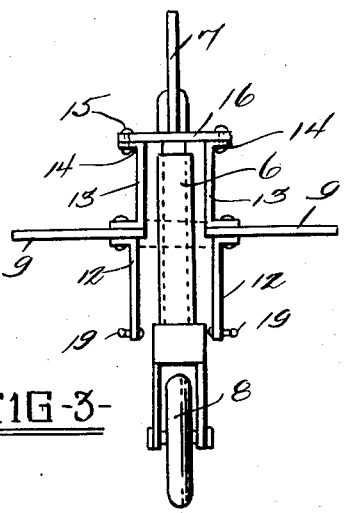
-FIG-3-
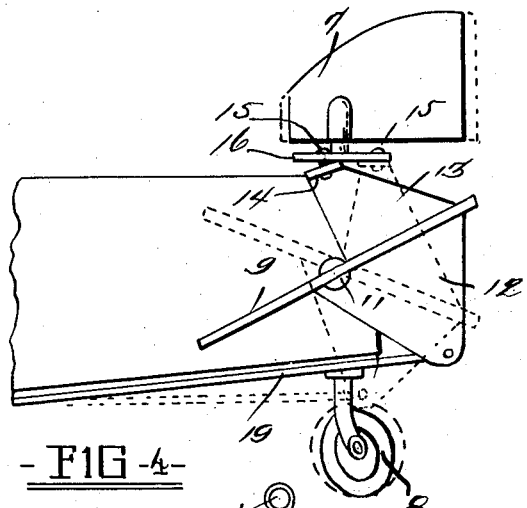
-FIG-4-
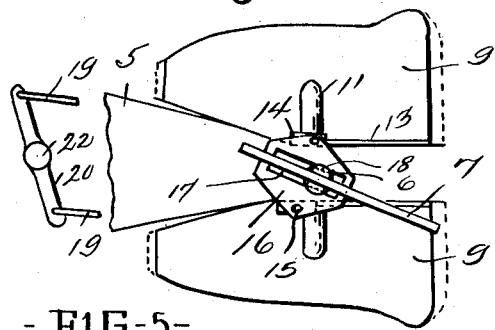
-FIG-5-
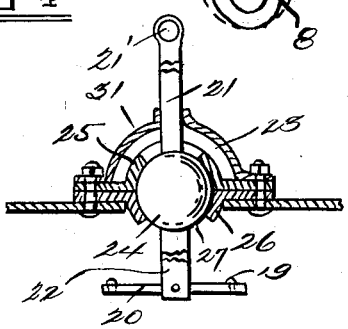
-FIG-6-
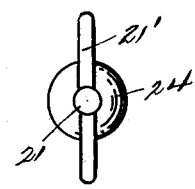
-FIG-7-
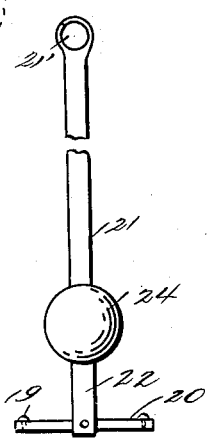
-FIG-8-
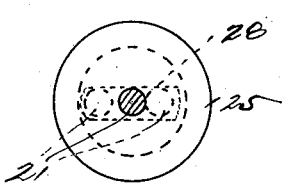
-FIG-9-
INVENTOR.
Anton Nosan
BY
John A. Bornhardt
ATTORNEY.

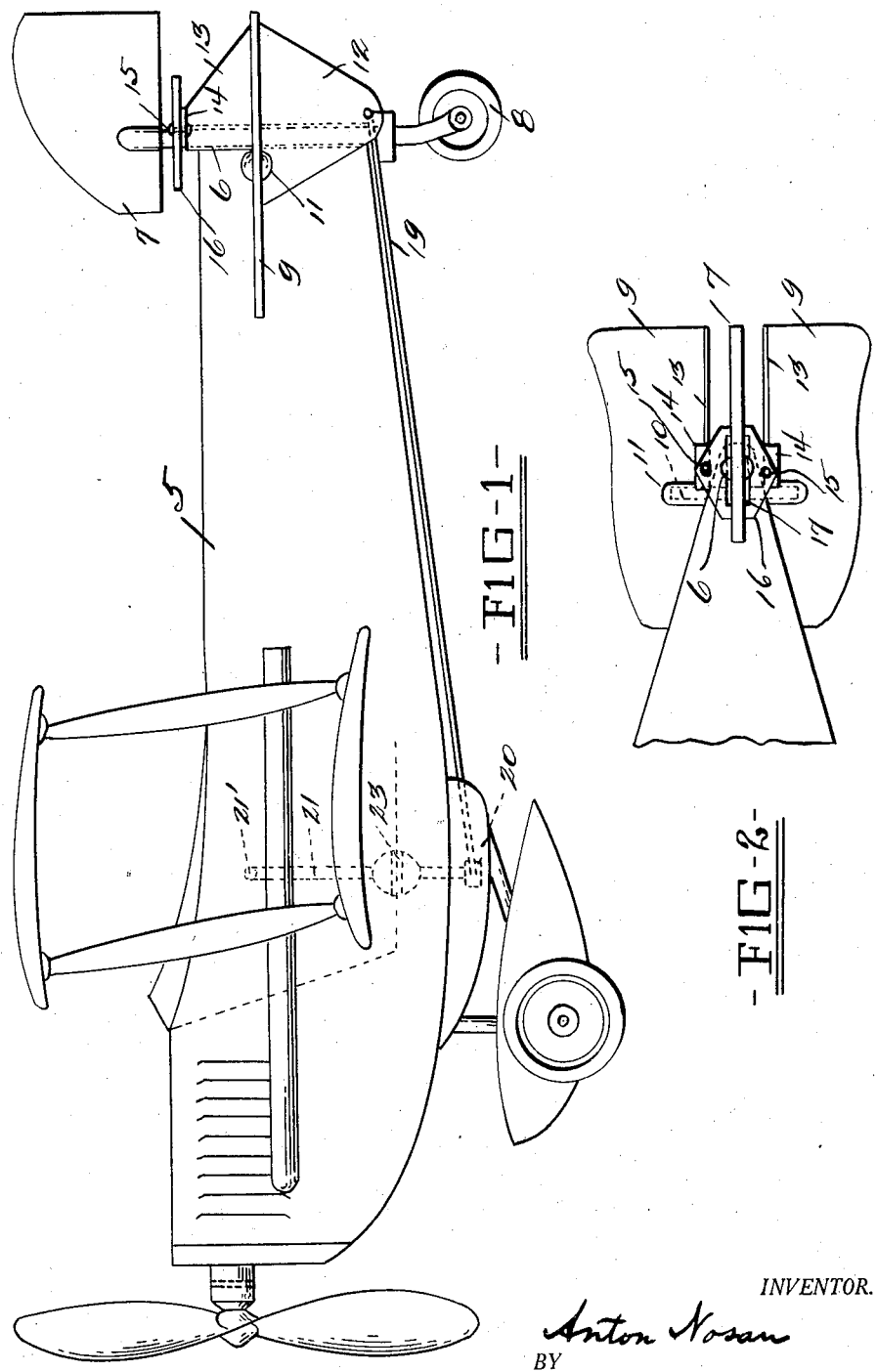

Patented Aug. 2, 1927.

1,637,872

UNITED STATES PATENT OFFICE.

ANTON NOSAN, OF CLEVELAND, OHIO.

STEERING MECHANISM FOR AEROPLANES.

Application filed July 26, 1926. Serial No. 124,952.

This invention relates to steering mechanisms particularly adapted for aeroplanes, and has for its object to provide an improved single controlling lever which may be turned or shifted back and forth to jointly or selectively control the movement of the horizontal or vertical rudders, so that the aeroplane may be steered up or down or banked at an angle by appropriate operation of the single steering post or lever, which controls all the rudders.

The invention is shown in the accompanying drawings, in which Fig. 1 is a side view of an aeroplane provided with the steering mechanism. Fig. 2 is a fragmentary plan view of the fuselage tail and rudders. Fig. 3 is an end elevation thereof. Fig. 4 is a similar side view showing the rudders positioned for a left turn or bank. Fig. 5 is a top plan of the parts shown in Fig. 4. Fig. 6 is a detail section of the control post and its mountings. Fig. 7 and Fig. 8 are detail views of the control post. Fig. 9 is a top view of the control post mounting.

The fuselage 5 has a rudder post 6 with a vertical rudder 7 mounted on the top thereof and a tail wheel 8 at the bottom. The horizontal rudders 9 are horizontally pivoted on a transverse post or pin 10, as indicated at 11. Lower brackets 12 depend from the under side of the rudders 9 and upper brackets 13 project upwardly therefrom, with the upper ends flanged as at 14 and provided with pivot pins 15 which are loosely connected to a horizontal plate 16 having a slot 17 engaging the flat sides 18 of the rudder post 6, as shown in Fig. 5.

The lower ends of brackets 12 are connected by links 19 to a cross piece 20 at the bottom of the hand or controlling lever or post 21, which has a cross bar handle 21' and a ball 24 which is held in a socket mounting 23. The socket comprises upper and lower sections 25 and 26 bolted to the floor 27 of the fuselage. The bottom of the lower socket section 25 has a circular opening 27, and the top socket section 26 has a slot 28 extending lengthwise. This mounting permits the post to be turned right or left or to swing back and forth, or to have both motions simultaneously. A flexible air proof covering 21 is provided over the socket.

In operation, when it is desired to turn to the left, the post 21 is turned to the left and the cross bar 20 thru links 19 thereby tilts the horizontal rudders 9 to opposite inclinations, the front end of the right hand rudder tilting upwardly and the front end of the left hand rudder tilting downwardly. At the same time, the pins 15 on the brackets 13 turn the plate 16 and the rudder post 6 attached thereto. This post carries and turns the vertical rudder 7 as well as the wheel 8. The rudder 7 steers the aeroplane and the fins 9 turn the fuselage about its axis for banking, thereby tending to prevent side slip of the aeroplane in the air. The operation is reversed for a right hand turn. To steer the aeroplane upwardly, the lever 21 is swung forwardly, thereby lifting the rear ends of the horizontal rudders 9. To turn the aeroplane downwardly, the post 21 is pulled to the rear in slot 28, thereby reversing the action of the horizontal rudders 9. To turn to the left and upwardly, the post 21 is turned to the left and at the same time pushed forwardly and the rudders take a corresponding inclination; and reversely for a right up turn. For straight flying, the post 21 is held in neutral vertical position.

By the means described, a single central control is provided for all the rudders, enabling them to be shifted according to any desired direction.

I claim:

1. A steering mechanism for aeroplanes or the like, comprising a steering post, a vertical rudder mounted thereon, a pair of horizontal rudders at opposite sides of the post, connections between the horizontal rudders and the post, whereby to turn the latter when the former are tilted in opposite directions, and a single controlling lever operatively connected to the horizontal rudders to so tilt the same.

2. In a steering mechanism for aeroplanes, the combination of a vertical steering post and a vertical rudder mounted thereon, a pair of horizontal rudders pivoted at opposite sides of the post, a loose connection between the horizontal rudders and the post permitting tilt of the former on their pivots without turning the post, and a single rotary and swinging control lever operatively connected to the horizontal rudders and adapted when swung to tilt both horizontal rudders in the same direction and when turned to tilt them respectively in opposite directions, the connections between the post and the horizontal rudders being constructed to turn the post when the levers are tilted oppositely.

3. A steering mechanism for aeroplanes and the like comprising a steering post provided with a vertical rudder and having a flattened portion, a pair of horizontal rudders pivoted at opposite sides of the post, a plate loosely connected to the horizontal rudders and having a slot thru which the flattened part of the post extends, whereby the horizontal rudders may be tilted in the same direction without disturbing the plate or the post when the rudders are tilted in opposite directions, and a swinging and turning controlling lever operatively connected to the horizontal rudders for tilting the same either similarly or oppositely.

4. A controlling mechanism for aeroplanes and the like comprising a socket having a slot, a lever extending thru the slot and provided with a ball held in the socket, whereby it may be turned or swung or both, horizontal and vertical rudders, connecting means between the horizontal and the vertical rudders to turn the latter when the former are tilted, and means connecting the lever and the horizontal rudders to tilt the latter selectively according to rotary or swinging movement of the lever or both.

5. A steering mechanism for aeroplanes or the like, comprising a steering post, a vertical rudder mounted thereon, a pair of horizontal rudders mounted at opposite sides of the post respectively, upper brackets on the horizontal rudders, a plate loosely mounted on the brackets and adapted to swing therewith when the horizontal rudders are both tilted in the same direction and to turn when they are tilted in opposite directions, said plate having a slidable and non-rotating connection with the post, and a single controlling lever operatively connected to the horizontal rudders and movable in a plurality of directions to selectively tilt the horizontal rudders either in the same or different directions.

In testimony whereof, I do affix my signature.

ANTON NOSAN.